Figure 1:
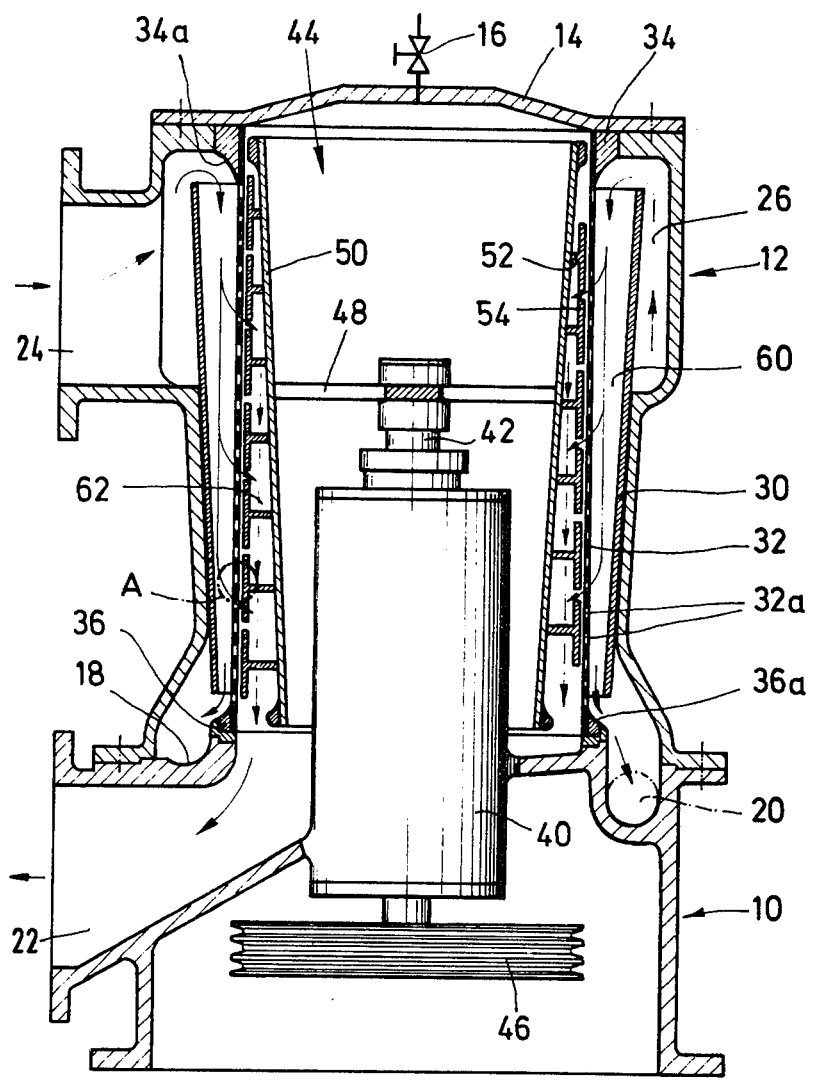

United States Patent [19]

Holz

[11] 4,287,055
[45] Sep. 1, 1981

[54] METHOD OF SORTING FIBRE SUSPENSIONS AS WELL AS A PRESSURE SORTER FOR PERFORMING THE METHOD

[75] Inventor: Emil Holz, Eningen, Fed. Rep. of Germany

[73] Assignee: Firma Hermann Finckh Maschinenfabrik GmbH & Co., Fed. Rep. of Germany

[21] Appl. No.: 52,806

[22] Filed: Jun. 28, 1979

[30] Foreign Application Priority Data

Jul. 11, 1978 [DE] Fed. Rep. of Germany ....... 2830386

[51] Int. Cl.³ .............................................. B07B 1/04
[52] U.S. Cl. ................................... 209/240; 209/273; 209/300; 209/306
[58] Field of Search .............. 209/273, 268, 306, 305, 209/379, 300, 240, 243; 210/415

[56] References Cited

U.S. PATENT DOCUMENTS

| | | | |
|---|---|---|---|
| 2,942,730 | 6/1960 | Fontein | 209/273 X |
| 3,223,239 | 12/1965 | Dick | 209/273 X |
| 3,245,535 | 4/1966 | Cowan | 209/273 X |
| 3,394,809 | 2/1968 | Hunter | 209/273 |
| 3,420,373 | 1/1969 | Hunter | 209/273 |
| 3,441,130 | 4/1969 | Sisson | 209/273 X |
| 3,477,571 | 11/1969 | Maag | 209/273 X |
| 3,547,267 | 12/1970 | Sutherland | 209/306 X |
| 3,581,903 | 6/1971 | Holz | 210/415 |
| 3,680,696 | 8/1972 | Horin | 209/306 X |
| 3,939,065 | 2/1976 | Ahlfors | 209/270 X |
| 4,166,028 | 8/1979 | Weber | 209/273 |

FOREIGN PATENT DOCUMENTS 2548578 12/1977 Fed. Rep. of Germany .......... 209/306

Primary Examiner—Robert Halper

[57] ABSTRACT

Pressure sorting method and apparatus in which the velocity of the rejected suspension component along the screen surface in a substantially direct path to a rejected suspension outlet has a vertical velocity component which is a multiple of the velocity of the accepted suspension through the screen openings by virtue of the cross-sectional area of the unsorted and rejects annular chamber at the inlet end being less than one third the sum of the clear cross-sections of the screen openings. The velocity ratio is maintained by decreasing the area of the annular chamber from the inlet to the rejects outlet. In a preferred embodiment, the accepts annular chamber increases towards the accepts outlet to compensate for the decrease in the unsorted and rejects annular chamber area.

9 Claims, 4 Drawing Figures

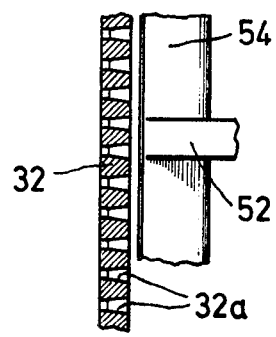
FIG. 2
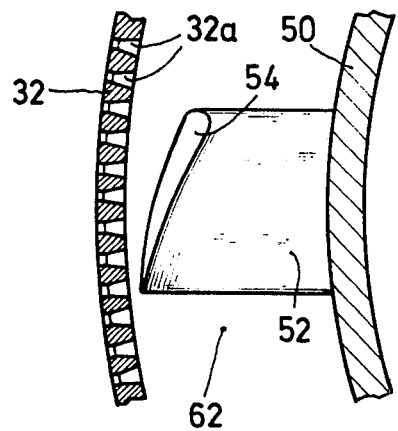
FIG. 4
FIG. 3
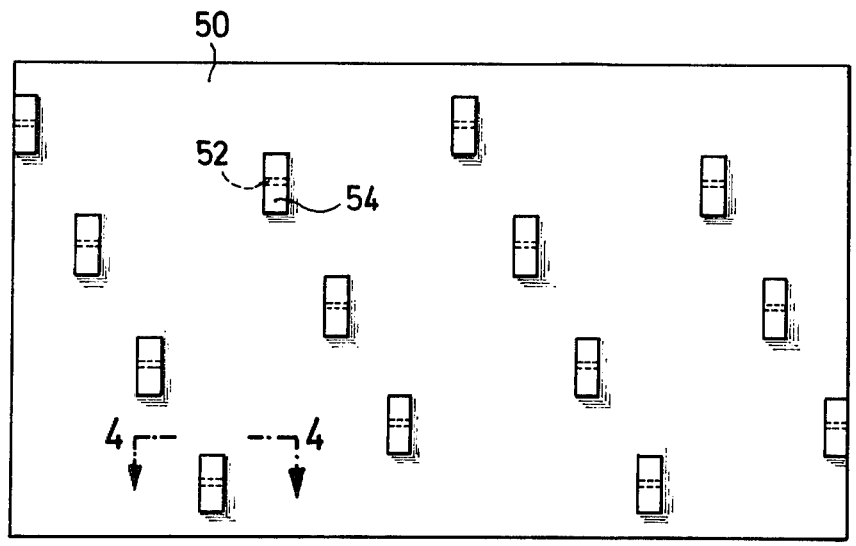

METHOD OF SORTING FIBRE SUSPENSIONS AS WELL AS A PRESSURE SORTER FOR PERFORMING THE METHOD

DESCRIPTION

In known pressure sorters, a cylindrical rotor is arranged in the interior of a likewise cylindrical sieve and its jacket has attached thereto shifter rails or cleaning blades which extend over the entire length of the rotor; they travel at a small distance from the sieve and avoid a blockage of the sieve openings by impulses of overpressure produced in front of the cleaning blades, as well as by impluses of underpressure produced behind the cleaning blades. In the known pressure sorters, relatively high rotor speeds are necessary in order to keep the sieve openings free; this does not only require driving energy, but makes itself felt in a disturbing manner when such a pressure sorter is located immediately in front of a paper machine, since the strong pressure impulses lead to irregularities in the paper formation.

Furthermore, in the known pressure sorters difficulties have arisen with the segregation of long fibre contaminations, such as hairs, as well as splinters, since in them e.g. hairs may pass through even the finest sieve openings.

The invention was based on the problem to reduce the pressure impulses which occur in the wanted material during sorting out of the fibre suspensions, without it being necessary thereby to tolerate the risk of blockage of the sieve openings. According to the invention, it is proposed to arrange a method of sorting fibre suspensions in which the fibre suspension to be sifted is guided over a sieve and is divided into a stream of wanted material and a stream of unwanted material, in such a manner that the fibre suspension to be sifted is guided over the sieve in such a manner that the component of the flow speed which is parallel to the surface of the sieve, of the fibre suspension to be sifted is a multiple of the flow speed through the sieve openings; particularly favourable results may be obtained when the component parallel to the sieve surface, of the flow speed of the fibre suspension to be sifted is at least three times higher than the flow speed through the sieve openings. Extensive experiments of the Applicant have shown that the high flow speed parallel to the sieve surface exerts a beneficial cleaning effect on the sieve openings, so that when the method according to the invention is applied to pressure sorters, the rotary speed of the rotor and the size of the cleaning blades may be reduced; this leads to a reduction of the pressure impulses occurring in the wanted material. Moreover the method according to the invention leads to a considerably more efficient separation of long fibre contaminations, hairs and splinters which are carried away by the strong current parallel to the sieve surface by the unwanted material, as they cannot perform the strong change of direction into the sieve openings. In this connection, attention is to be drawn to the fact that in sieves with slot-like openings the flow should occur approximately perpendicular to the longitudinal direction of the slots.

In a pressure sorter with an inlet for the suspension to be sifted, a wanted material outlet for the sifted suspension and an unwanted material outlet provided in a casing in which a drivable rotor is mounted which is rotatable about an axis, and in which an annular sieve is held which is arranged co-axial with the rotor axis and which separates an annular inlet chamber on the inlet side of the sieve from a wanted material chamber on the outlet side of the sieve, wherein one end region of the inlet chamber is connected to the inlet and the other end region of the inlet chamber is connected to the unwanted material outlet, the method according to the invention may be realised most simply in that the cross-section perpendicular to the rotor axis, of the inlet chamber decreases from the inlet end region to the outlet end region and is smaller at the inlet end region than the sum of the clear cross-sections of the sieve openings. Owing to the tapering of the inlet chamber in the direction of the rotor axis a constantly high flow speed along the sieve is ensured in spite of the proportion of the fibre suspension flowing away into the wanted material chamber, and owing to the stated cross-section conditions the high flow speed parallel to the sieve surface may be obtained, without the need for connecting a pump with an uneconomically high power consumption ahead of the pressure sorter.

Owing to the fact that in a pressure sorter according to the invention, the task to avoid a blockage of the sieve openings is not afforded to the cleaning blades alone of the rotor, but is performed to a considerable extent by the flow along the inlet chamber, the rotor speed and the size of the cleaning blades can be reduced considerably; this leads, however, to a considerable reduction of the amplitudes of the overpressure and underpressure impulses in the wanted material; this has an extremely advantageous effect on the regularity of the paper formation. In this connection, attention may be drawn to the fact that a reduction of the peripheral speed of the cleaning blades by 2 meters per second causes always a consequential halving of the amplitude of the pulsations in the wanted material. However, the cleaning of the sieve openings by means of the flow of the fibre suspension to be sifted permits also the use on the rotor of cleaning blades which are now only very thin and small; in a preferred constructional form of a pressure sorter according to the invention a plurality of cleaning blades extending merely over a fraction of the rotor length are arranged one above the other and distributed over the periphery of the rotor on the jacket of the rotor as well being mutually offset thereon in the peripheral direction; this contributes to a further reduction of the pressure differences in the wanted material.

Further features of the invention are clear from the accompanying claims and/or the following description and the accompanying pictorial illustration of a preferred constructional form of a pressure sorter according to the invention; in the drawing, there are shown in:

FIG. 1 an axial section through the pressure sorter;

FIG. 2 the portion A of FIG. 1 on a larger scale;

FIG. 3 a development of the rotor jacket with cleaning blades attached thereto, in the view from outside, and FIG. 4 a section through a portion of the rotor jacket and one of the cleaning blades on the line 4—4 in FIG. 3, the sieve also being indicated.

FIG. 1 illustrates a pressure sorter casing which comprises a lower casing part 10, an upper casing part 12 and a cover 14 the highest point of which is provided with a ventilation valve 16. The lower casing part 10 forms a so-called unwanted material groove 18 which extends over the upper surface of the lower casing part and terminates in an unwanted material outlet 20. Furthermore, the lower casing part is provided with a wanted material outlet 22.

The upper casing part 12 possesses an inlet 24 for the fibre suspension to be sifted, the inlet terminating in an annular inlet chamber 26. An interchangeable cone 30 is inserted in the upper casing part 12 and tapers downwardly, extending upwardly as far as into the upper region of the annular inlet chamber 26. It encloses a cylindrical sieve 32 which is stationarily retained in the upper casing part 12 and the upper and lower edge of which is fixed to rings 34 and 36 secured to the casing. The sieve openings have been denoted by 32a.

The lower casing part 10 supports a bearing body 40 for a shaft 42 of a rotor generally denoted by 44; for the drive thereof a belt pulley 46 is attached to the lower end of the shaft 42. By means of a cross arm 48, the upper end of the shaft 42 supports a conical jacket 50 of the rotor; on the outside thereof a plurality of small cleaning blades 54 are fixed thereto by means of short rails 52. As may be seen from FIG. 3, the distribution of the cleaning blades 54 over the periphery of the rotor was so selected in accordance with the invention that the over-pressure and underpressure inpulses produced by the cleaning blades in the fibre suspension are uniformly distributed in time; together with the fact that each cleaning blade is relatively small, this has the effect that the pressure fluctuations which occur at the wanted material outlet 22 remain relatively small. As may be seen from FIG. 4, the cleaning blades 54 are slightly inclined relatively to their direction of movement in such a manner that on the leading side in the direction of rotation of the cleaning blades a positive pressure impulse, and at the trailing blade edge a negative pressure impulse is produced in the gap between the cleaning blade and the sieve. The reverse flushing and flushing effects produced thereby in the sieve openings 32a are to prevent a blockage of the sieve openings.

According to the invention the inlet chamber 60 formed by the cone 30 and the sieve 32 tapers from the top to the bottom, whereas according to a further feature of the invention an annular space 62 formed between the sieve 32 and the rotor jacket 50 widens from the top to the bottom.

The lower end of the inlet chamber 60 opens into the unwanted material groove 18, whereas the lower end of the annular space 62 opens into the wanted material outlet 22.

Since, as will still be shown, the fibre suspension to be treated by the pressure sorter is to have a flow speed with a relatively high vertical speed component in the inlet chamber 60, it is advantageous to provide rounded portions 34a and 36a at the inlet end and outlet end of the inlet chamber 60.

As may be seen from FIG. 2, the preferred constructional form of the pressure sorter according to the invention comprises sieve openings constructed in the form of bores which widen in the flow direction. As will still be shown, these do not, however, involve the only possible construction of the sieve openings.

The fibre suspension to be sifted is then fed under pressure into the inlet 24 by means of a pump not illustrated, and the pump power must be of such magnitude that all chambers of the pressure sorter are subjected to overpressure. The fibre suspension flows through the inlet chamber 26 and over the upper edge of the interchangeable cone 30 into the inlet chamber 60 from where it flows at a relatively high vertical speed component downwardly in the direction of the unwanted material groove 18. Because of the feed pressure produced by the pump a large portion of the usable fibres of the fibre suspension together with a portion of the dressing water passes through the sieve openings 32a and travels through the annular space 62 into the wanted material outlet 22. Thereby the suspension volume in the inlet chamber 60 is reduced; this would lead there to a slowing down of the vertical flow speed, unless the volume reduction would not be compensated by the reduction of the cross-section of the inlet chamber. Corresponding considerations apply to the annular space 62.

According to the invention, the cross-sectional area of the conical inlet chamber 60 is considerably smaller at its upper end than the total area of the clear openings of the sieve 32, in order to obtain in the inlet chamber a high flow speed parallel to the sieve surface.

The feed power of the pump not illustrated and preceding the inlet 24 is so adjusted to the flow resistance of the pressure sorter and the subsequent pipe line system that the component parallel to the surface of the sieve 32, of the flow speed of the fibre suspension in the inlet chamber 60 amounts to a multiple of the flow speed in the sieve openings 32a.

In a preferred constructional form of the method according to the invention, performed with a pressure sorter according to the invention, the flow speed of the fibre suspensions in the sieve openings 32a amounts to approximately 1 m/s or less, whereas the vertical component of the flow speed in the inlet chamber 60 amounts to from 3 to 8 m/s or is even higher still.

The necessary rotary speed of the rotor 44 may be reduced by the neasures according to the invention; whereas heretofore in pressure sorters the speed of the cleaning blades of the rotor amounted to at least 10 m/s and in most cases to more, a pressure sorter according to the invention is satisfied without difficulty with a speed of the cleaning blades through the suspension of 10 m/s.

If the openings of the sieve 32 are to be of slot-shaped configuration, it is advisable to have the slots extend approximately in the peripheral direction of the sieve. Furthermore it is then advisable to construct cleaning elements arranged on the rotor, in the form of a spiral which effects a downwardly directed feed effect when the rotor is in rotation.

According to the invention the flow speed of the fibre suspension along the sieve in the direction of the rotor axis may be increased further still in that in comparison with usual pressure sorters a higher proportion of the fibre suspension to be processed is withdrawn as unwanted material from the unwanted material outlet 20, e.g. in order to sort the unwanted material further in a further sorting apparatus, in particular in a so-called unbalance shaker, and/or in order to supply a portion of the unwanted material withdrawn again to the inlet 24 of the preceding pump. Thus for example from 5 to 10% of the fibre suspension fed to the inlet 24 may be supplied through the unwanted material outlet 20 to after-sorting in an unbalance shaker, whereas from 10 to 20% of the quantity of fibre suspension fed to the inlet 24 is withdrawn through the unwanted material outlet 20 and fed again to the pump which feeds the fibre suspension into the inlet 24.

I claim:

1. In a method of sorting fibrous suspension by feeding the suspension under pressure through an inlet to one side of a screen, flowing the suspension over the screen to sort the suspension into a rejected suspension component flowing along the surface of the screen and an accepted suspension component flowing through the openings of the screen to the other side and generating pressure pulses in the accepted suspension component on said other side of the screen to keep the openings free, the improvement comprising flowing the rejected suspension component along the screen surface in a substantially direct path to an outlet at a velocity having a component directly from the outlet to the inlet which is at least three times the velocity of the accepted suspension component through the screen openings, whereby long fiber contaminations are subtantially prevented from entering the screen openings.

2. In the method of sorting fibrous suspension of claim 1 wherein the suspension is flowed over a screen having a substantially circular cross-section from an inlet at one end of the screen to an outlet at the other end of the screen, the pressure pulses are generated by a rotor mounted concentrically relative to the screen and the velocity component directly from the outlet to the inlet is in the direction of the rotor axis.

3. In an apparatus for pressure sorting fibrous suspension comprising a housing, a screen having a substantially circular cross-section mounted within the housing, a rotor mounted concentrically relative to the screen, the housing and the side of the screen opposite the rotor forming an annular chamber therebetween, an inlet for fibrous suspension to be sorted in communication with one end of the annular chamber, a first outlet for rejected suspension in communication with the other end of the annular chamber, and a second outlet for accepted suspension passing through the openings of the screen in communication with the side of the screen facing the rotor, the improvement comprising a decrease in the annular cross-sectional area of the annular chamber from said one end of the annular chamber to said other end of the annular chamber, the cross-sectional area of the annular chamber at said one end being a maximum of one third the sum of the clear cross-sections of all of the screen openings from said one end to the other end whereby in operation the velocity of the rejected suspension along the side of the screen opposite the rotor from the inlet in a substantially direct path to the first outlet has a velocity component in the direction of the rotor axis which is at least three times the velocity of the accepted suspension component through the openings of the screen.

4. In the apparatus of claim 3, the rotor being mounted concentrically within the screen, the portion of the housing forming the outer wall of said annular chamber being substantially conical with an inside diameter decreasing from said inlet toward said first outlet.

5. In the apparatus of claims 3, the screen openings being circumferentially-oriented slots.

6. In the apparatus of claims 3, 4 or 5, the side of the screen facing the rotor and the rotor forming a second annular chamber, the cross-sectional area of the second annular chamber increasing towards the second outlet to compensate for the decrease in cross-sectional area of the annular chamber formed by the housing and the screen towards the first outlet.

7. In the apparatus of claim 5, the rotor being mounted concentrically within the screen, the portion of the rotor forming the inner wall of said annular chamber being substantially conical with an outside diameter decreasing toward said second outlet.

8. In the apparatus of claim 3, the rotor comprising cleaning blades arranged adjacent the screen, each cleaning blade extending over only a fraction of the rotor length, the cleaning blades being oriented relative to one another to form a series of spirals spaced around the circumference of the rotor.

9. The apparatus of claim 3, further comprising a ring around the screen at each end to secure the screen to the housing, a portion of each ring being in communication with the annular chamber, said portion of each of the rings being concave.

* * * * *